(12) United States Patent
Azam et al.

(10) Patent No.: US 11,003,236 B2
(45) Date of Patent: May 11, 2021

(54) CHANGING DISPLAYED COLORS TO SAVE POWER

(71) Applicant: HEWLETT-PACKARD DEVELOPMENT COMPANY, L.P., Houston, TX (US)

(72) Inventors: Syed S. Azam, Houston, TX (US); Thong Thai, Houston, TX (US); Mike Provencher, Houston, TX (US); Rahul V. Lakdawala, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 84 days.

(21) Appl. No.: 16/078,467

(22) PCT Filed: Oct. 20, 2016

(86) PCT No.: PCT/US2016/057961
§ 371 (c)(1),
(2) Date: Aug. 21, 2018

(87) PCT Pub. No.: WO2018/075050
PCT Pub. Date: Apr. 26, 2018

(65) Prior Publication Data
US 2019/0025900 A1 Jan. 24, 2019

(51) Int. Cl.
*G06F 1/32* (2019.01)
*G06F 1/3234* (2019.01)
*G06F 1/3212* (2019.01)
*G06F 1/20* (2006.01)
*G06F 1/3218* (2019.01)
*G09G 5/02* (2006.01)

(52) U.S. Cl.
CPC ............ *G06F 1/3265* (2013.01); *G06F 1/206* (2013.01); *G06F 1/3212* (2013.01); *G06F 1/3218* (2013.01); *G09G 5/02* (2013.01); *G09G 2320/0666* (2013.01); *Y02D 10/00* (2018.01)

(58) Field of Classification Search
CPC ..... G06F 1/32; G06F 1/26; G06F 1/00; G06F 9/44
See application file for complete search history.

(56) References Cited

U.S. PATENT DOCUMENTS 9,075,612 B2 7/2015 Yang et al.
9,093,028 B2 7/2015 Chaji
(Continued)

OTHER PUBLICATIONS

Whitman, "How Much Power Does a Black Interface Really Save on AMOLED Displays?", Retrieved from Internet: https://www.greenbot.com/article/2834583/how-much-power-does-a-black-interface-really-save-on-amoled-displays.html, Oct. 21, 2014, 6 pages.

*Primary Examiner* — Keshab R Pandey
(74) *Attorney, Agent, or Firm* — Trop, Pruner & Hu PC

(57) ABSTRACT

In some examples, an electronic device includes a display panel comprising a plurality of pixels; and a controller to, for achieving power saving at the electronic device, select a theme from a plurality of themes that specify respective different display characteristics of displayed content, the different display characteristics including different colors, and based on the selected theme, change a display characteristic of the displayed content, the changing of the display characteristic including changing a color displayed by a portion of the plurality of pixels from a first color to a second, different color.

20 Claims, 4 Drawing Sheets

(56) References Cited

U.S. PATENT DOCUMENTS

| | | |
|---|---|---|
| 9,171,496 B2 | 10/2015 | Park et al. |
| 2002/0186214 A1 | 12/2002 | Siwinski |
| 2003/0135288 A1 | 7/2003 | Ranganathan et al. |
| 2005/0068311 A1* | 3/2005 | Fletcher ................ G06F 1/3218 345/211 |
| 2005/0122063 A1 | 6/2005 | Lee |
| 2008/0267536 A1* | 10/2008 | Moroney ................ G06T 5/00 382/311 |
| 2009/0235177 A1* | 9/2009 | Saul ................ G06F 3/0227 715/740 |
| 2009/0244110 A1* | 10/2009 | Ogura ................ G09G 3/3233 345/690 |
| 2010/0174930 A1 | 7/2010 | Kim et al. |
| 2011/0041156 A1 | 2/2011 | Ramaswamy |
| 2011/0185205 A1* | 7/2011 | You ................ G06F 1/3203 713/320 |
| 2012/0026519 A1 | 2/2012 | Yoshida |
| 2013/0130745 A1 | 5/2013 | Niu et al. |
| 2014/0139542 A1* | 5/2014 | Plowman ................ G06F 1/3265 345/589 |
| 2015/0244925 A1* | 8/2015 | Kawai ................ H04N 5/23293 348/349 |
| 2015/0348496 A1* | 12/2015 | Santos, II ................ G06F 9/4451 345/520 |
| 2016/0048021 A1* | 2/2016 | Border ................ G02B 27/0172 345/690 |
| 2016/0314763 A1* | 10/2016 | Matthews ................ G09G 5/10 |

* cited by examiner

CHANGING DISPLAYED COLORS TO SAVE POWER

BACKGROUND

Electronic devices include display devices to display images. A display device can include an array of pixels, which can be controlled to produce a target image on the display device.

BRIEF DESCRIPTION OF THE DRAWINGS

Some implementations of the present disclosure are described with respect to the following figures.

DETAILED DESCRIPTION

Figure 1:
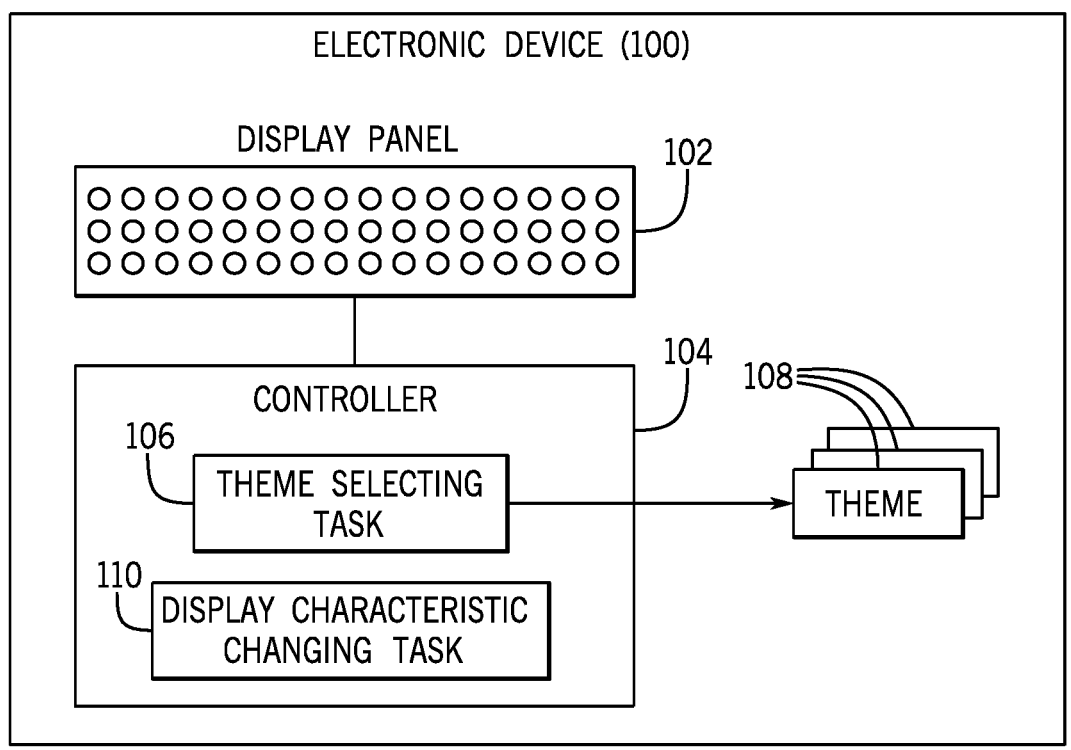
FIG. 1 is a block diagram of an electronic device according to some examples.

In the present disclosure, the article "a," "an", or "the" can be used to refer to a singular element, or alternatively to multiple elements unless the context clearly indicates otherwise. Also, the term "includes," "including," "comprises," "comprising," "have," or "having" is open ended and specifies the presence of the stated element(s), but does not preclude the presence or addition of other elements.

An electronic device can include a display panel for displaying information. The display panel can consume a relatively large amount of power when in use, particularly when displaying images with bright colors. To achieve power savings, the display panel can be dimmed by reducing the brightness of a displayed image. In sleep mode, the display panel can be blanked such that no image is displayed by the display panel. Blanking the display panel is not a viable option for power savings when a user is actively interacting with the display panel. Dimming the displayed image by a sufficient amount to achieve a low power consumption goal can make the displayed image difficult to read by the user.

In accordance with some implementations of the present disclosure, power savings of electronic devices can be achieved by changing colors (and possibly other display characteristics) of content displayed by display panels. In some examples, the display panels can include organic light emitting display (OLED) panels that include pixels implemented with an array of organic light emitting diodes (OLEDs). The pixels can be individually controlled.

To achieve power saving in an electronic device, a controller can select a theme from multiple themes that specify respective different characteristics of displayed content, where the different characteristics include different colors and possibly other characteristics, such as brightness, resolution, contrast, and so forth. Based on the selected theme, the controller changes a color displayed by a portion of the plurality of pixels from a first color to a second, different color. More generally, based on the selected theme, the controller changes a display characteristic (or multiple display characteristics) of the displayed content, where the changed characteristic(s) can include any or some combination of the following: color, brightness, resolution, contrast, and so forth.

As used in the present disclosure, the term "theme" refers to any collection of preset information that represents a display characteristic (or multiple display characteristics) of content that is to be displayed by a display panel. A first theme can include preset information specifying first characteristics of displayed content. A second theme can include preset information specifying second characteristics of displayed content, where the second characteristics of the second theme can differ according to at least in one aspect from the first characteristics of the first theme. For example, the difference can be a difference in color, a difference in brightness, a difference in resolution, and so forth.

The different themes can be selected for use in achieving power saving in respective different contexts of use of the electronic device 200. For example, in a first context of use, a first theme can be selected, while in a second context of use, a second theme can be selected. A "context of use" of an electronic device can refer to a manner in which the electronic device is used (e.g., what type of content is being displayed), an environment in which the electronic device is used (e.g., low-light environment versus bright environment), a power source that is being used to power the electronic device (e.g., whether the electronic device is being powered by a battery or an external power source), and so forth.

FIG. 1 is a block diagram of an example electronic device 100. Examples of the electronic device 100 can include any of the following: a desktop computer, a notebook computer, a tablet computer, a smartphone, a wearable device (e.g., a smart watch, smart eyeglasses, a head-mounted device, etc.), a game appliance, a vehicle or a computer in a vehicle, and so forth.

The electronic device 100 includes a display panel 102, which can be an OLED panel or another type of panel. The display panel 102 includes an array of pixels (represented by dots in FIG. 1). In some examples, such as with an OLED panel, the pixels can be individually controlled, such as to turn the pixel on or off or to adjust an amount of light emitted by the pixel.

Each pixel of on OLED panel can include OLEDs of different colors. The OLEDs of different colors of each pixel can also be referred to as sub-pixels. An OLED includes an emissive electroluminescent layer, formed of a film of organic material, that is between electrodes. The layers that make up the OLED are arranged on a substrate. An OLED display device can operate without a backlight. When a voltage is applied across the electrodes, an electrical current flows through the emissive electroluminescent layer, which causes the emissive electroluminescent layer to emit light. The amount of light energy emitted by the emissive electroluminescent layer is based on the amount of electrical current passed through the OLED.

Although reference is made to OLED panels in the present disclosure, it is noted that techniques or mechanisms according to some implementations can be applied to other types of display panels.

The electronic device 100 also includes a controller 104. The controller 104 can include any or some combination of the following: a microprocessor, a core of a multi-core microprocessor, a microcontroller, a programmable gate array, a programmable integrated circuit device, or any other hardware processing circuit. The term "controller" can refer to a single electronic component (e.g., an integrated circuit device) or multiple electronic components. The term "controller" can also refer to a combination of a hardware processing circuit and machine-readable instructions that are executable on the hardware processing circuit.

The controller 104 is able to control display characteristics of content displayed by the display panel 102. In accordance with some implementations of the present disclosure, in response to an indication that power saving is to be performed, the controller 104 is able to perform a theme selecting task 106 and a display characteristic changing task 110.

The indication that power saving is to be performed can be responsive to a user selection to activate the feature of achieving power saving by changing display characteristics (this feature can be referred to as a "display-based power saving feature" in the ensuing discussion). For example, machine-readable instructions (such as an operating system, a basic input/output system (BIOS) program, an application program, etc.) can display a control element in a user interface, where the control element can be selected by a user to activate or deactivate the display-based power saving feature. Alternatively, a hardware control button or a shortcut key or key combination can be provided on the electronic device 100. When actuated, the hardware control button or shortcut key or key combination can indicate that the display-based power saving feature is to be activated.

In other examples, the indication to activate the display-based power saving feature is not in response to a manual user selection, but rather can be performed automatically by the electronic device 100, such as in response to detecting a low battery condition, an over-heating condition (where a temperature of the electronic device 100 has exceeded a specified temperature threshold), and so forth.

In response to the indication to activate the display-based power saving feature, the theme selecting task 106 performed by the controller 104 selects a theme from multiple themes 108 that specify respective different characteristics of displayed information. Generally, a theme 108 can specify display characteristic(s) that can achieve power saving over default display characteristic(s) used by the electronic device 100 to display content on the display panel 102. For example, default display characteristics can be specified by settings of an operating system.

For example, if the default display characteristics specify that the background displayed by the display panel 102 is white, then a theme 108 can specify use of a background with a darker color (e.g., black, dark gray, dark brown, etc.) to achieve power saving. If the display panel 102 is an OLED panel, then a pixel that displays a black color is turned off, which allows the pixel to achieve increased power saving. Since the background can cover a large portion of the display panel 102, setting the background to black can mean that a relatively large number of pixels are turned off.

More generally, certain colors cause OLEDs to emit at a higher light intensity (and thus consume more power), while other colors cause OLEDs to emit at a lower light intensity (and thus consume less power). The colors that emit at a higher light intensity can be referred to as "bright" colors, while the colors that emit a lower light intensity can be referred to as "dark" colors.

As more specific examples, the themes 108 can include a document display theme, which includes preset information that represent display characteristics for display a document, such as a text document presented by a word processing application. Generally, a document, such as a text document, that is being presented by a word processing application has lower display quality demands than graphical images, such as graphical images associated with a picture or a video. For example, a text document can be displayed in monochrome gray scale and still be legible to a user. As an example, the text document can be displayed with white text on a black or gray background. As another example, the text document can be displayed with a light gray text on a black background. Also, a text document can be displayed with a lower resolution without affecting its legibility. Additionally, the text document can be displayed at a lower brightness while still being legible.

Initially, the controller 104 may display content on the display panel 102 using the default colors, brightness, resolution, etc., of the display panel 102. However, if the controller 104 detects that the user of the electronic device 100 is working on (reading or editing) a text document, then the theme selecting task 106 of the controller 104 can select the document display theme from the themes 108.

However, if the controller 104 detects that the user has switched to viewing graphical images, then the controller 104 can either select another theme (e.g., a graphical image display theme) from among the themes 108, or can revert back to the default display settings of the electronic device 100.

A further example theme that can be included as part of the themes 108 is a low-light display theme, which can be selected by the theme selecting task 106 of the controller 104 in response to detecting that the electronic device 100 is used in an environment of low light, where "low light" can refer to light that is less than some specified threshold. The low-light display theme can specify characteristics that are suitable for a low-light environment. For example, the low-light display theme 108 can specify a lower brightness, colors of reduced light intensity that can be easily viewed in a low-light environment, and so forth. For example, in a bright environment, the colors of displayed content should be bright and have high contrast with the background to allow a user to more easily view the content. However, in a low-light environment, less contrast has to be present between the color(s) of the display content and the background color, such that a different set of color(s) can be specified in the low-light theme to achieve power saving.

As another example, the themes 108 can include a battery display theme to be used when the electronic device 100 is being powered by a battery. When the electronic device 100 is powered by an external source, the controller 104 can cause the display panel 102 to display content using default display settings, or alternatively, using another theme that is used when the electronic device 100 is powered by an external power source. However, when the controller 104 detects that the electronic device 100 is powered by a battery, the battery display theme can be selected to control display characteristic(s) of content displayed by the display panel 102. For example, the battery display theme can specify the use of a lower brightness and color(s) that can result in power saving.

The display characteristic changing task 110 of the controller changes, based on the selected theme (as selected by the theme selecting task 106), the display characteristic(s) of the content displayed by the display panel 102. For example, changing a display characteristic can include changing a color displayed by a portion of the pixels of the display panel from a first color (e.g., color of a default setting of the electronic device 100) to a second, different color as specified by the selected theme. Changing a color displayed by a portion of the pixels of the display panel 102 can refer to changing a color of a portion that is less than the entirety of the pixels of the display panel 102, or changing the color of all of the pixels of the display panel 102.

In further examples, a theme 108 can specify that colors of the displayed content (including the background) are to be inverted (e.g., white to black and black to white).

Generally, different themes 108 can correspond to different power savings. For example, a first theme can specify display characteristics that are to achieve a first level of power savings, while a second theme can specify display characteristics that are to achieve a second, different level of power savings. The theme selected can be based on a determination of a target level of power saving desired by the controller 104, such as based on a determination of whether the electronic device 100 is running on battery or is connected to an external power source.

Each theme of the themes 108 can have a user-override option, to allow a user to prevent the theme from being selected to provide the display-based power saving feature. For example, the user-override option for each theme can be presented as a list of user-override options for the respective themes 108. The user can select the respective user-override option(s) to disable the corresponding theme(s).

In some examples, the theme selecting task 106 and the display characteristic changing task 110 can be performed by machine-readable instructions (such as those of an operating or an application program). In such examples, a main processor (which can be part of the controller 104) of the electronic device 100 is involved in changing a display characteristic of the displayed content using a selected theme.

In alternative examples, at least one of the themes 108 may be implemented entirely in hardware, such as a video controller (which can be part of the controller 104). By implementing the theme in hardware, the main processor (and thus machine-readable instructions such as an operating system or an application program) of the electronic device 100 would not have to be involved in changing a display characteristic of displayed content, which can achieve even greater power saving. For example, the hardware, such as the video controller, can look at the color values of pixels to be displayed for each image frame, and can modify the color values to result in less light intensity emitted by the pixels of the display panel 102. In a specific example, the video controller can determine if there are more bright color pixels (first subset of pixels) than dark color pixels (second subset of pixels), by some specified threshold, for an image frame to be displayed by the video controller. If so, then the video controller can convert the first subset of bright color pixels (e.g., white color pixels) to black or dark gray pixels. The video controller further converts the dark color pixels of the second subset to bright color pixels (e.g., by increasing the white, red, green, and/or blue color) to make such pixels of the second subset more legible with respect to the pixels of the first subset. Thus, the hardware can change a display characteristic of displayed content without involving any machine-readable instructions of the electronic device.

To achieve even more power savings, an active non-critical application can be throttled such that the application runs at a slower speed. Running the application at a slower speed consumes less processor cycles per time duration, which can result in reduced activity of a processor for power savings.

Figure 2A:
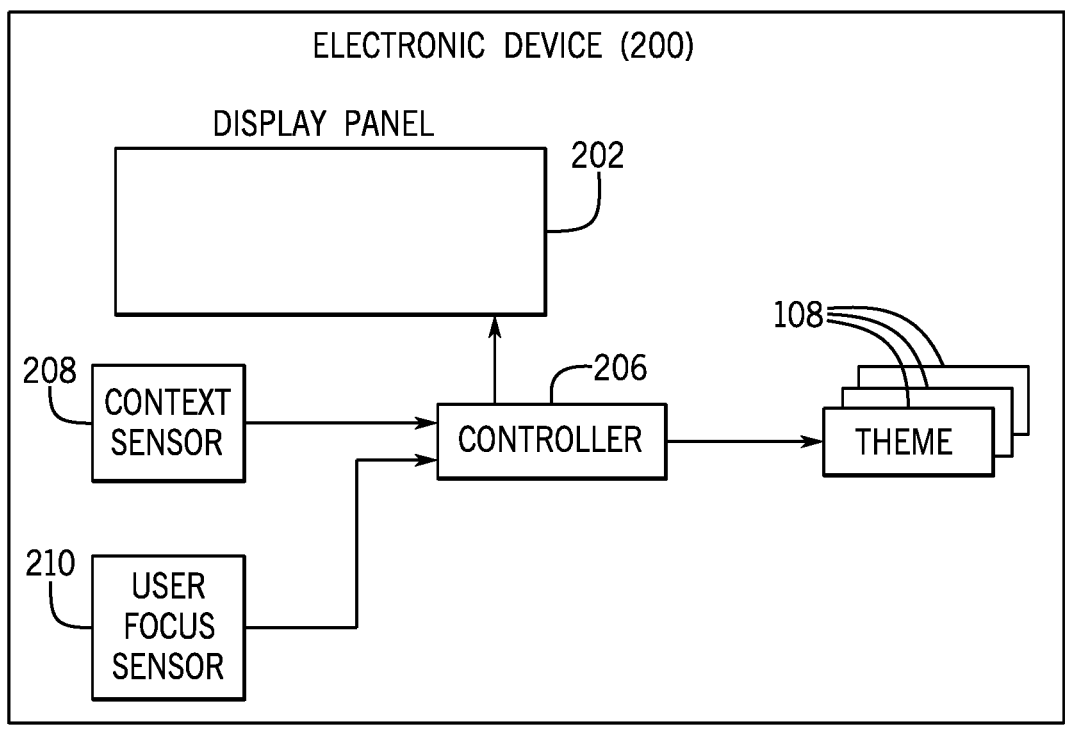
FIG. 2A is a block diagram of an electronic device according to further examples.

FIG. 2A is a block diagram of an electronic device 200 according to further examples. In the example of FIG. 2A, the electronic device 200 includes a display panel 202 and a controller 206 that is able to control display characteristics of the content displayed by the display panel 202. The electronic device 200 has a context sensor 208, which is able to detect a context of use of the electronic device 200. For example, the context sensor 208 can include a light sensor to determine the amount of light of the environment in which the electronic device 200 is located. The light sensor can detect a low-light condition, which can be provided as an indication to the controller 206. In response to the low-light indication, the controller 206 can select a low-light display theme from among the themes 108.

In other examples, the context sensor 208 can include a program executing in the electronic device 200 that is able to determine what type of display content is being displayed on the display panel 202. The program can be part of the operating system, for example. If the context sensor 208 detects that the user is working on a text document (as opposed to a graphical image), then the controller 206 can select a document display theme from among the themes 108 to use for adjusting the display characteristics of the displayed content.

As a further example, the context sensor 208 can include a circuit or a program in the electronic device 200 that is able to detect whether the electronic device 200 is running on battery or is being powered by an external source. If the context sensor 208 indicates that the electronic device 200 is being powered by a battery, then the controller 208 can select a battery display theme that controls display characteristics of the display content when the electronic device 200 is running on battery.

In further examples, the electronic device 200 can include a user focus sensor 210, which is able to determine a region of user focus on a display panel. For example, the user focus sensor 210 can include a camera that is able to capture images of the eyes of the user of the electronic device 200. The captured images of the user's eyes are provided to the controller 206, which is able to determine the direction of gaze of the user's eyes. For example, the controller 206 can determine that the user's gaze is focused on a bottom half of a display panel 202. As a result, the controller 206 can apply the display-based power saving feature to the upper half of the display panel (the portion that is not the subject of user focus), while the lower half of the display panel can display content using default display settings, for example.

More generally, the display-based power saving feature is applied to a portion of the pixels of the display panel that is not the subject of user focus, as determined based on output of the user focus sensor 210 received by the controller 206.

Figure 2B:
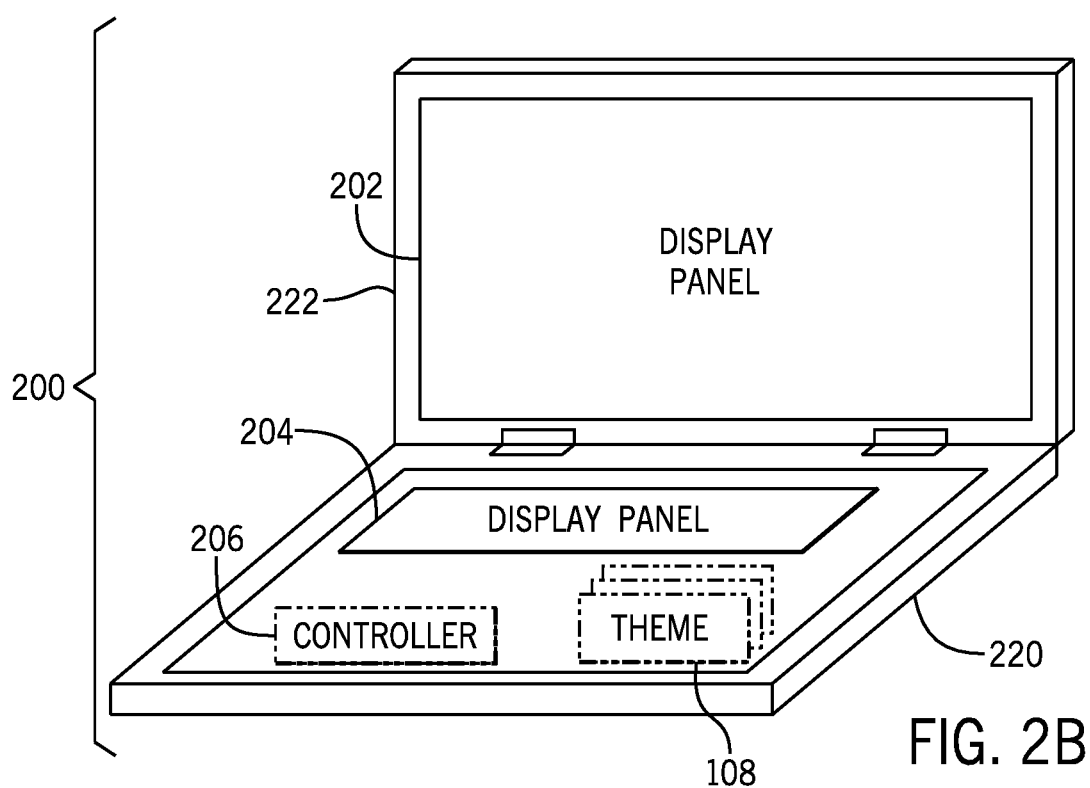
FIG. 2B is a schematic diagram of an electronic device including a base and a display unit pivotable with respect to the base, according to alternative examples.

FIG. 2B illustrates a more specific example of the electronic device 200. In FIG. 2B, the electronic device 200 includes a base 220 and a display unit 222 that is pivotable with respect to the base 220. The display panel 202 of FIG. 2A can be part of the display unit 222, while a second display panel 204 can be part of the base 220. Depending upon the relative pivoted position of the base 220 and the display unit 222, the display panels 202 and 204 can be used for displaying different types of content, or one of the display panels 202 and 204 can be deactivated. For example, when the display unit 222 and the base 220 of the electronic device 200 are arranged such that the electronic device 200 has a clamshell arrangement (which is shown in FIG. 2B), then the display panel 202 of the display unit 222 can display content to be viewed by a user (e.g., content displayed by application programs), while the display panel 204 of the base 220 can be used to display a virtual user input device, such as a virtual keyboard, that the user can interact with to make inputs to the electronic device 200.

In other cases, the base 220 and the display unit 222 of the electronic device 200 can be pivoted to different positions so that the electronic device 200 has other arrangements, such as a tablet arrangement (where the electronic device 200 is used as a tablet computer), a book arrangement (where the electronic device 200 is used as a book reader), and so forth. In these different arrangements, the display panels 202 and 204 can display different content, and in some cases, one of the display panels 202 and 204 can be deactivated or turned off.

In further examples, the controller 206 can determine that the user's focus is on the first display panel 202 and not on the second display panel 204. In such cases, the display-based power saving feature that changes display characteristics to achieve power saving can be applied to the second display panel 204 but not the first display panel 202.

In accordance with additional examples, different themes can be associated with respective different modes of operation of the electronic device. As examples, the modes of operation can include:
a clamshell mode that corresponds to the clamshell arrangement of the base 220 and the display unit 222,
a tablet mode that corresponds to the tablet arrangement of the base 220 and the display unit 222,
a book mode that corresponds to the book arrangement where the base 220 and the display unit 222 are pivoted with respect to one another and held in an orientation that is similar to a way a user would hold a book when the book is in an open position and the user is reading the book,
a flat mode of operation, where the display unit 222 is rotated by about 180° with respect to the base 220, and the electronic device 200 is laid flat on a planar surface,
a tent mode of operation, where the display unit 222 is pivoted to be angled with respect to the base 220, and the electronic device 200 is placed generally in a portrait orientation, and
a stand mode of operation, where the display unit 222 has been rotated by greater than 270° with respect to the base 220, such that the display panel 202 of the display unit 220 is at an angle and faces toward the user, whereas the display panel 204 of the base 220 faces a surface on which the electronic device 200 is placed.

Depending on the mode of operation used, one of the respective themes corresponding to the different modes of operation can be selected. A mode of operation can be an example of a context of use of the electronic device 200 that can be detected using the context sensor 208 (e.g., which can detect the rotational angle of a hinge connecting the display unit 222 to the base 220, and which can detect an orientation of the electronic device 200).

Figure 3:
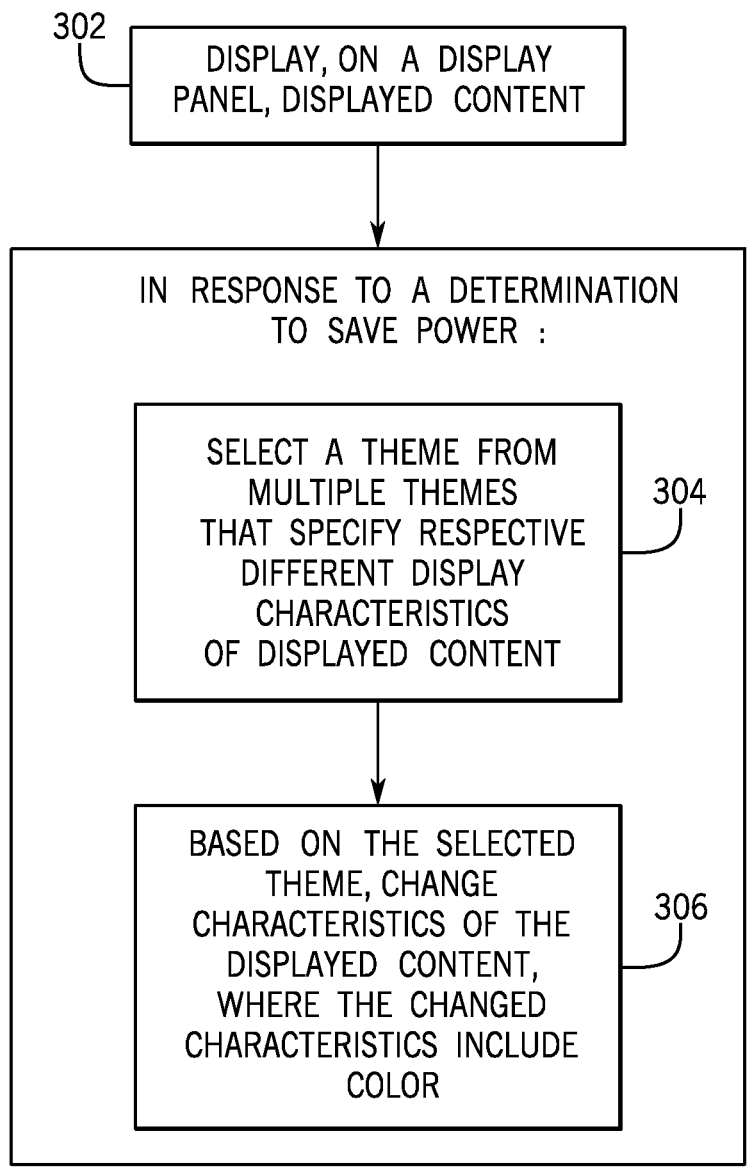
FIG. 3 is a flow diagram of a process according to some examples.

FIG. 3 is a flow diagram of an example process according to some implementations. The process displays (at 302), on a display panel that has multiple pixels that are individually controllable, displayed content. In response to a determination to save power (such as detecting that the electronic device is being run on battery or in response to a user indication), the process of FIG. 3 can perform the following tasks. The process can select (at 304) a theme from multiple themes that specify respective different display characteristics of displayed content. Based on the selected theme, the process changes (at 306) characteristics of the displayed content, where the changed characteristics include color.

Figure 4:
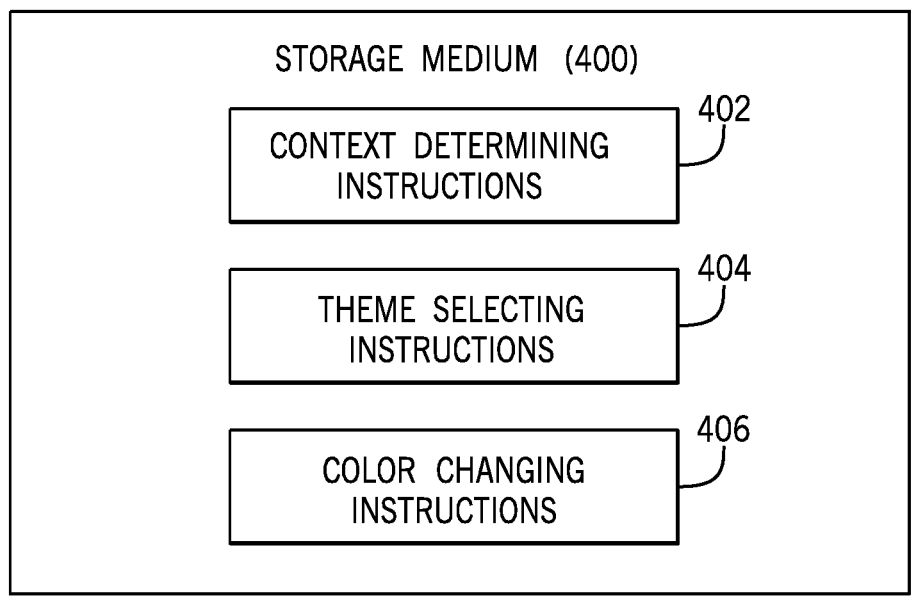
FIG. 4 is a block diagram of a storage medium storing machine-readable instructions according to some examples.

FIG. 4 is a block diagram of a non-transitory machine-readable or computer-readable storage medium that stores machine-readable instructions that upon execution can cause an electronic device to perform respective tasks. The machine-readable instructions include context determining instructions 402 to determine a context of use of an electronic device. To achieve power saving, the machine-readable instructions include theme selecting instructions 404 and color changing instructions 406. Based on the determined context, the theme selecting instructions 404 select a theme from multiple themes that specify a respective different display characteristics of displayed content. Based on the selected theme, the color changing instructions 406 change a color displayed by a portion of the pixels of the display panel from a first color to a second, different color.

The storage medium 400 can include any or some combination of the following: a semiconductor memory device such as a dynamic or static random access memory (DRAM or SRAM), an erasable and programmable read-only memory (EPROM), an electrically erasable and programmable read-only memory (EEPROM) and a flash memory; a magnetic disk such as a fixed, floppy and removable disk; another magnetic medium including a tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:
1. An electronic device comprising:
a display panel comprising a plurality of pixels; and
a controller to:
determine whether the electronic device is in a low-light environment; and
in response to determining that the electronic device is in the low-light environment:
determine which of a plurality of different power sources is used to power the electronic device;
select, based on which power source is used, a selected theme from a plurality of themes that specify respective different colors of displayed content, wherein the selected theme is for the low-light environment, the selected theme is a first theme that specifies a first color responsive to a first power source of the plurality of different power sources being used to power the electronic device, and the selected theme is a second theme that specifies a second color responsive to a second power source of the plurality of different power sources being used to power the electronic device, wherein the first theme is different from the second theme, and the first color is different from the second color, and
based on the selected theme for the low-light environment, change a color of the displayed content.

2. The electronic device of claim 1, wherein the selecting of the selected theme is further based on a type of the displayed content.

3. The electronic device of claim 1, wherein the plurality of themes further specify additional different display characteristics selected from among brightness, display resolution, and contrast.

4. The electronic device of claim 1, wherein the changing of the color includes inverting colors displayed by a portion of the plurality of pixels between different colors.

5. The electronic device of claim 4, wherein the inverting of the colors comprises changing between bright colors and dark colors.

6. The electronic device of claim 1, wherein the plurality of themes correspond to different levels of power savings, and the selecting of the selected theme from the plurality of themes is further based on a determination of a target level of power saving.

7. The electronic device of claim 1, wherein the changing of the color of the displayed content is performed by hardware of the controller without involvement of any machine-readable instructions of the electronic device.

8. The electronic device of claim 1, wherein the controller is a video controller.

9. The electronic device of claim 1, further comprising a light sensor to provide measurement data relating to an amount of light of an environment of the electronic device, and wherein the controller is to determine whether the electronic device is in the low-light environment based on the measurement data from the light sensor.

10. The electronic device of claim 1, wherein the controller is to:
receive an indication that power saving is to be performed,
wherein the changing of the color of the displayed content is further responsive to the indication.

11. The electronic device of claim 10, wherein the indication is responsive to a user selection to activate a feature of achieving power saving.

12. An electronic device comprising:
a display panel comprising a plurality of pixels; and
a controller to:
determine, based on an output of images of eyes of a user captured by a sensor, a user focus on a first region of a displayed content displayed by the display panel, and a second region of the displayed content on which the user is not focused,
determine which of a plurality of different power sources is used to power the electronic device,
select, based on which power source is used, a selected theme from a plurality of themes that specify respective different colors of the displayed content, wherein the selected theme is a first theme that specifies a first color responsive to a first power source of the plurality of different power sources being used to power the electronic device, and the selected theme is a second theme that specifies a second color responsive to a second power source of the plurality of different power sources being used to power the electronic device, wherein the first theme is different from the second theme, and the first color is different from the second color, and
based on the selected theme, change a color of the second region of the displayed content from a first color to a second, different color.

13. The electronic device of claim 12, wherein the display panel is a first display panel, the electronic device further comprising a second display panel, wherein the first region of the displayed content is on the first display panel and not on the second display panel, and the second region of the displayed content is on the second display panel, and wherein the controller is to apply the changing of the color in the second display panel but not the first display panel responsive to a determination that the user focus is on the first display panel and not on the second display panel.

14. A non-transitory machine-readable storage medium storing instructions that upon execution cause an electronic device to:
determine whether the electronic device is in a low-light environment; and
in response to determining that the electronic device is in the low-light environment:
determine which of a plurality of different power sources is used to power the electronic device;
select, for the low-light environment and based on which power source is used, a selected theme from a plurality of themes that specify respective different colors of displayed content that is displayed by a display panel comprising a plurality of pixels, wherein the selected theme is a first theme that specifies a first color responsive to a first power source of the plurality of different power sources being used to power the electronic device, and the selected theme is a second theme that specifies a second color responsive to a second power source of the plurality of different power sources being used to power the electronic device, wherein the first theme is different from the second theme, and the first color is different from the second color, and
based on the selected theme for the low-light environment, change a color displayed by a portion of the plurality of pixels.

15. The non-transitory machine-readable storage medium of claim 14, wherein the selecting of the selected theme is further based on a type of the displayed content.

16. The non-transitory machine-readable storage medium of claim 14, wherein the changing of the color comprises inverting colors displayed by the portion of the plurality of pixels.

17. The non-transitory machine-readable storage medium of claim 16, wherein the inverting of the colors comprises changing between bright colors and dark colors.

18. The non-transitory machine-readable storage medium of claim 14, wherein the determining that the electronic device is in the low-light environment is based on measurement data from a light sensor relating to an amount of light of an environment of the electronic device.

19. The non-transitory machine-readable storage medium of claim 14, wherein the instructions upon execution cause the electronic device to:
receive an indication that power saving is to be performed,
wherein the changing of the color is further responsive to the indication.

20. The non-transitory machine-readable storage medium of claim 19, wherein the indication is responsive to a user selection to activate a feature of achieving power saving.

* * * * *